Jan. 3, 1928.
W. R. GREEN
LUGGAGE CARRIER AND RACK
Filed April 18, 1924
1,654,728
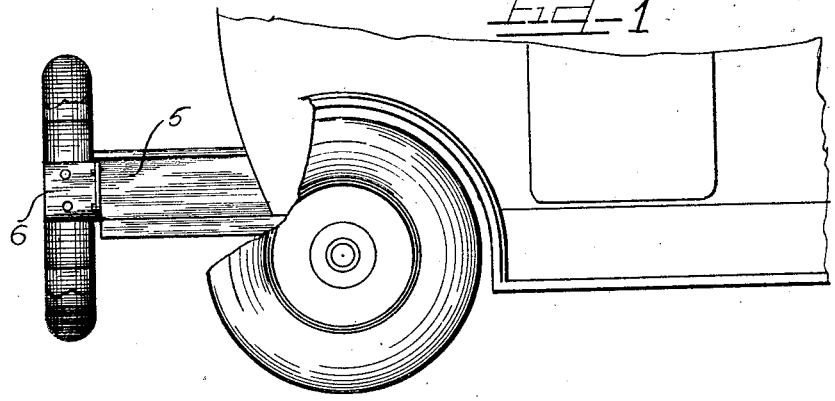
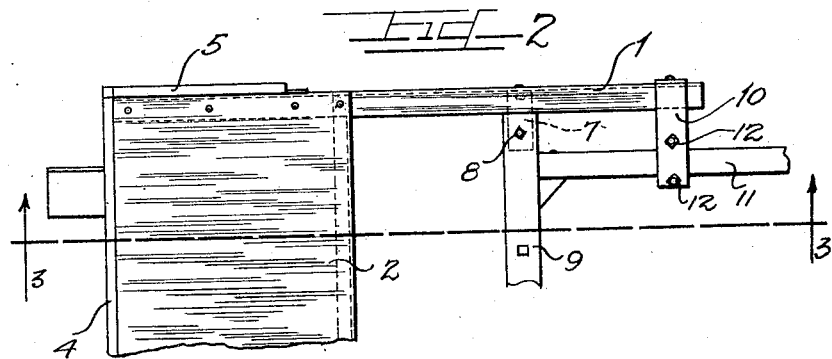
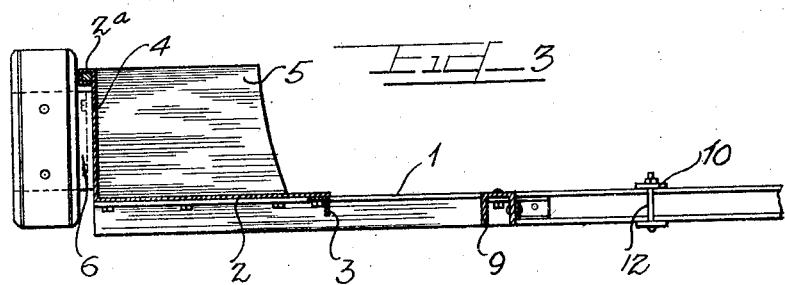
Inventor
Walter R. Green Patented Jan. 3, 1928.

1,654,728

UNITED STATES PATENT OFFICE.

WALTER R. GREEN, OF CHICAGO, ILLINOIS; ALBERT H. GREEN, EXECUTOR OF SAID WALTER R. GREEN, DECEASED, ASSIGNOR TO INTERNATIONAL STAMPING COMPANY, OF CHICAGO, ILLINOIS, A CORPORATION OF ILLINOIS.

LUGGAGE CARRIER AND RACK.

Application filed April 18, 1924. Serial No. 707,339.

This invention relates to a compound rear end tire and luggage carrier adapted for attachment to the rear end of a vehicle, and it is an object of this invention to generally improve such types of carrier.

The invention comprises the novel structure and combinations hereinafter described and more particularly pointed out and defined in the appended claim.

In the drawings which illustrate a preferred embodiment of this invention and in which similar reference numerals refer to similar features in the different views:

Figure 1 is a fragmentary side elevational view of an automobile with the carrier applied thereto.

Figure 2 is a fragmentary plan view of the carrier.

Figure 3 is a sectional view upon the line 3—3 of Figure 2.

Referring to the drawings, it will be observed that I have illustrated a luggage carrier comprising side rails 1 which are in the form of angle bars which support a box like structure open at its forward end and having a bottom 2 braced by a light transverse angle bar 3, a back 4 and lateral sides 5 which are shaped at their forward ends to fit the contour of the rear of the automobile body, and which stop short of the forward end of the platform 2 in order that the said platform may extend a short distance under the body. A bead 2ª extends around the top of the sides and rear to reinforce the same. This construction provides a closed compartment in connection with the back of the vehicle body for holding luggage.

A pair of brackets 6 are attached to the rear wall 4 of the carrier for supporting a tire carrier of any suitable construction.

In order to attach the carrier to the chassis of an automobile, a pair of inwardly extending lugs 7 are attached to the side rails 1 for receiving the bolt 8 in the transverse member 9 of the chassis. As this bolt 8 is already present in the chassis, no extra holes need be drilled. The side bars 1 extend forward beyond the lugs 7 and a U-clamp 10 is attached to each side rail and extends so as to embrace the top and bottom of the longitudinal beam 11 of the chassis. A pair of bolts 12, one contiguous to each side of the beam 11, extend through the clamp 10 for clamping the carrier to the chassis.

I am aware that numerous details of construction may be varied through a wide range without departing from the principles of this invention, and I therefore do not purpose limiting the patent granted, otherwise than necessitated by the prior art.

I claim as my invention:

In a rear end luggage carrier for a vehicle having side rails and a transverse member, a side bar secured to each rail and having a connection with the transverse member, a rigid box-like structure upon said side bars, comprising a rear end and side members shaped to fit the rear of the vehicle body and a bottom projecting forward of said side members for insertion under the body.

In testimony whereof I have hereunto subscribed my name.

WALTER R. GREEN.